April 13, 1926.

H. THOMAS ET AL

SLICING MACHINE

Filed May 5, 1923

Witness:
Dave S. Magnusson.

Inventors
Henry Thomas
Cornelis F. Jr. van Berkel
By Nissen & Crane Attys.

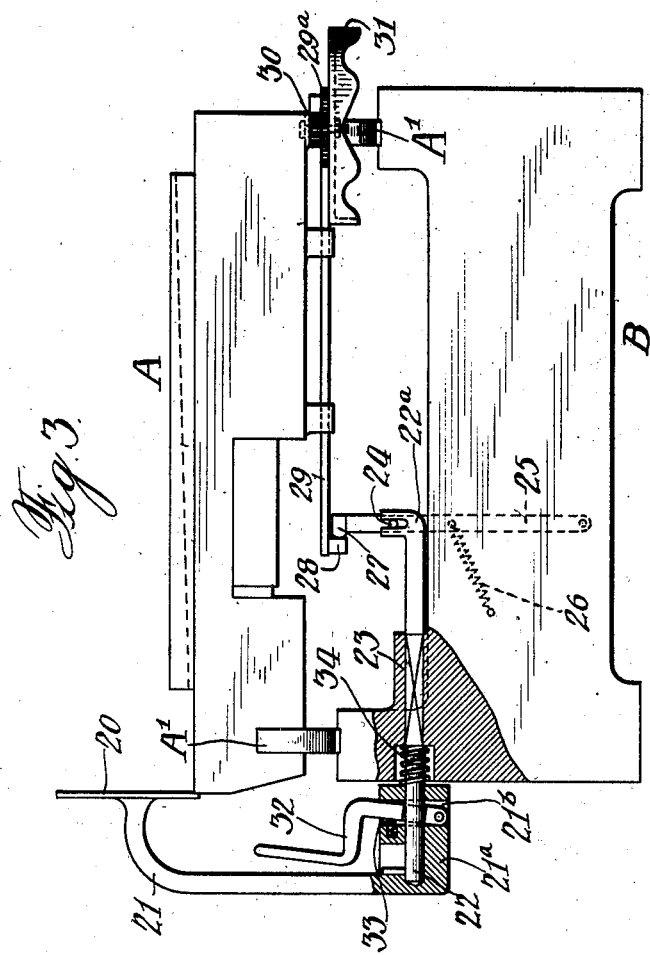

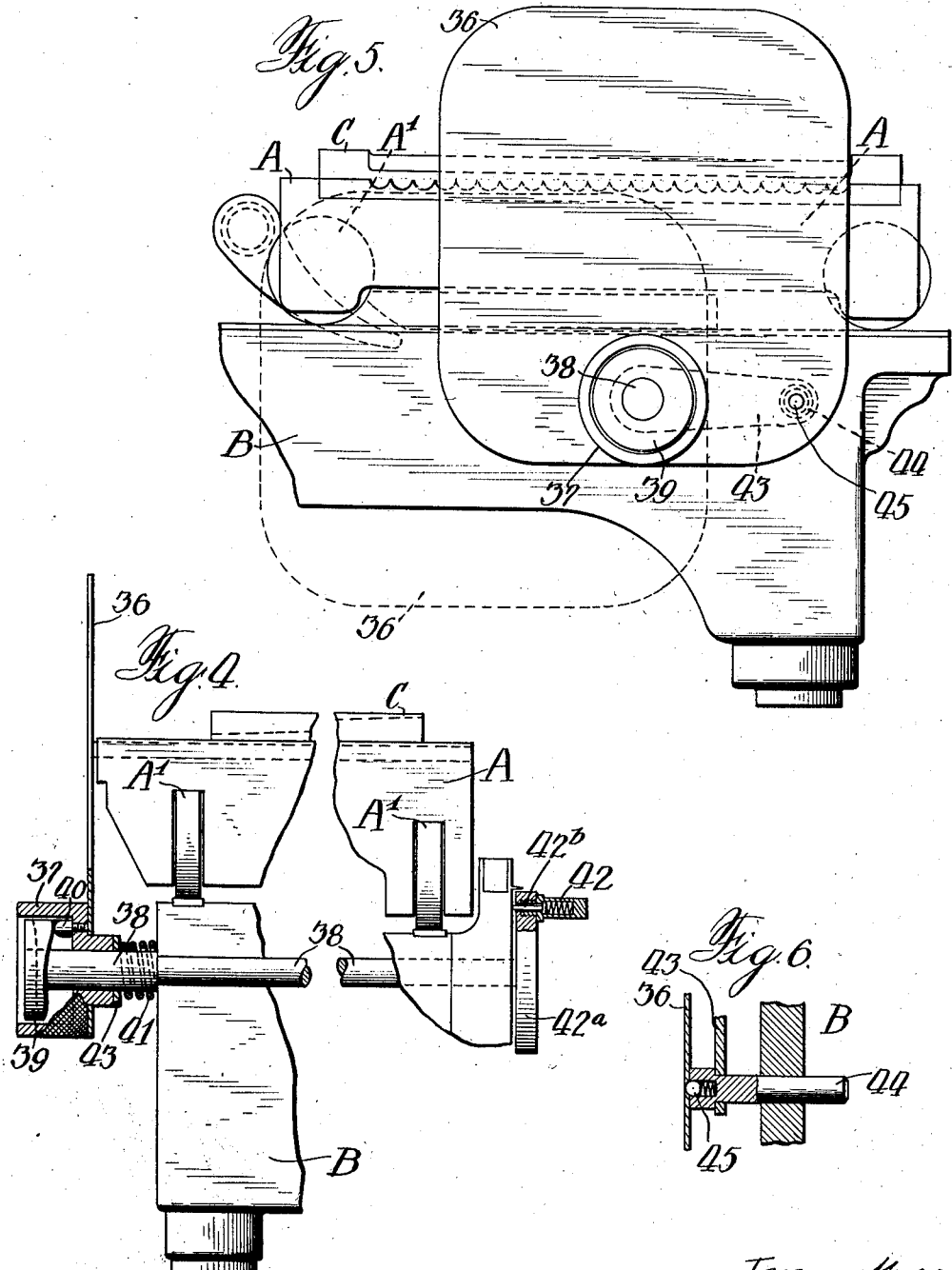

April 13, 1926.
H. THOMAS ET AL
1,580,932
SLICING MACHINE
Filed May 5, 1923  4 Sheets-Sheet 4
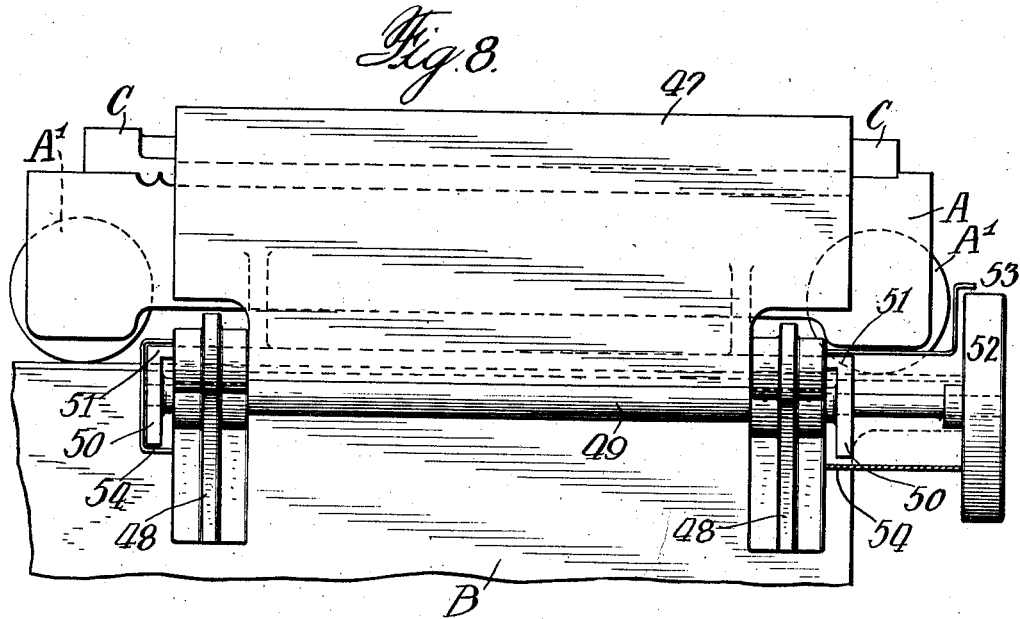
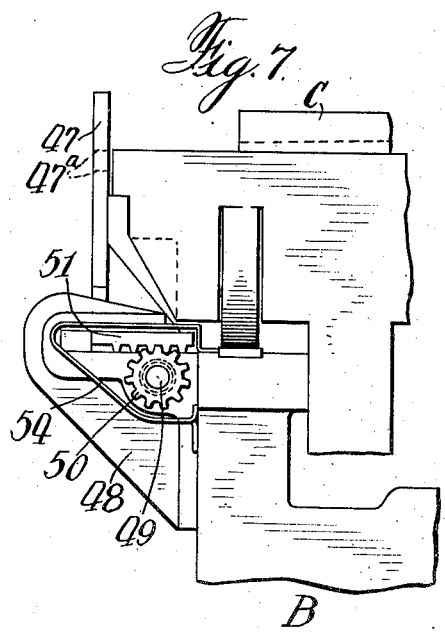
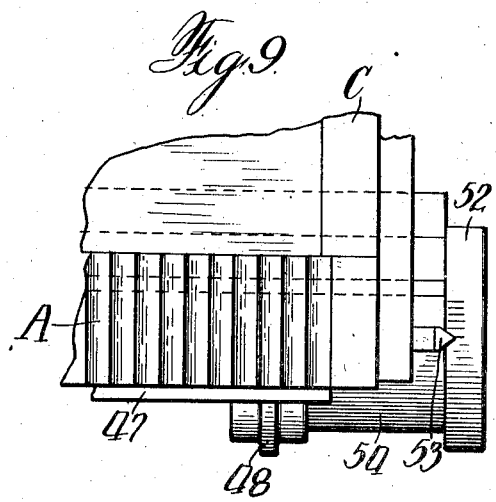

Patented Apr. 13, 1926.

1,580,932

UNITED STATES PATENT OFFICE.

HENRY THOMAS, OF LONDON, ENGLAND, AND CORNELIS F. M. VAN BERKEL, OF ROTTERDAM, NETHERLANDS, ASSIGNORS TO U. S. SLICING MACHINE COMPANY, OF LA PORTE, INDIANA, A CORPORATION OF INDIANA.

SLICING MACHINE.

Application filed May 5, 1923. Serial No. 636,830.

*To all whom it may concern:*

Be it known that we, HENRY THOMAS, a subject of the King of England, residing at East Ham, London, England, and COR-NELIS F. M. VAN BERKEL, a subject of the Queen of the Netherlands, residing at Rotterdam, Netherlands, have invented certain new and useful Improvements in Slicing Machines, of which the following is a specification.

This invention relates to machines for slicing meat and other substances.

In such machines as generally constructed means are provided for automatically advancing relative to the cutter the supporting table or plate for the substance to be sliced with an intermittent or stepwise movement so that after a slice is severed by the action of the cutter the leading or front face of the uncut portion of the substance will be advanced past the cutting plane a distance equal to the required thickness of the next slice.

Now it frequently happens when using meat slicing machines that after one or more slices have been cut from a piece of meat it has to be temporarily removed from the machine which may, for example, be more urgently required for slicing another kind or piece of meat, and, when the first piece is replaced, it seldom occupies the correct position with its leading or front face in the cutting plane or parallel to said plane and at a distance therefrom equal to the distance or an exact multiple of the distance which the meat supporting table or plate advances at each step. Because of this the first slice, or slices, cut on the replacement of the piece is, or are, irregular in shape and (or) thickness and is, or are, very often unsaleable for that reason. These irregularities are particularly disadvantageous when meat, such as bacon or ham is to be sliced for frying or grilling, since non-uniformity in thickness renders a slice less suited for this purpose.

Some known forms of slicing machines, however, have fence plates or abutments against which the meat is pressed and which are capable of being adjusted for the purpose of determining the thickness of the slices to be cut. These known arrangements, although they eliminate the aforesaid difficulty arising from the improper positioning of the meat to be sliced, are not altogether satisfactory, mainly because they hinder free access to the meat support from the front.

The present invention consists of the inclusion in or the application to a slicing machine of a fence plate or abutment (which, if desired, may be made so as to act merely as a gauge) for use only in initially setting the substance to be sliced so as to ensure that the first slice severed will be of the desired thickness and adapted after the substance has been initially set to be removed from the machine or moved to an inoperative position to give free access to the supporting table or plate for the substance which during the operation of the machine is fed intermittently forward in such manner as to yield further slices of the desired thickness after the first slice independently of said plate or abutment. When used as a gauge the plate is so arranged as to give free access to the supporting table or plate.

The invention can be carried into effect in many ways some of which are illustrated, merely by way of example, on the accompanying drawings as applied to slicing machines of the reciprocating carriage type.

On the drawings—

Fig. 3 is an end elevation, partly in section, of a slicing machine showing another arrangement wherein the fence plate or abutment is adapted to be instantly moved to an inoperative position or, if necessary, removed from the machine;

Fig. 4 is an end elevation, and Fig. 5 a side elevation of part of a slicing machine fitted with an adjustable fence plate or abutment arranged to be turned down to an inoperative position out of the way of the substance after it has been initially set on the table of the machine, and Fig. 6 is a sectional detail;

Fig. 7 is an end elevation, Fig. 8 a side elevation, and Fig. 9 a plan of part of a slicing machine showing another arrangement of adjustable fence plate or abutment adapted to be moved horizontally to an inoperative position after the substance has been initially set on the table of the machine.

In each arrangement illustrated, A denotes the machine carriage mounted on rollers A¹ and adapted to be reciprocated in known manner on the base B past the knife or cutter (not shown). Slidable on the carriage in a direction at right angles to its line of travel is the usual supporting table or plate C for the substance and at each reciprocation of the carriage the table or plate C is advanced a step by suitable mechanism ready for the severance of the next slice.

Figure 1:
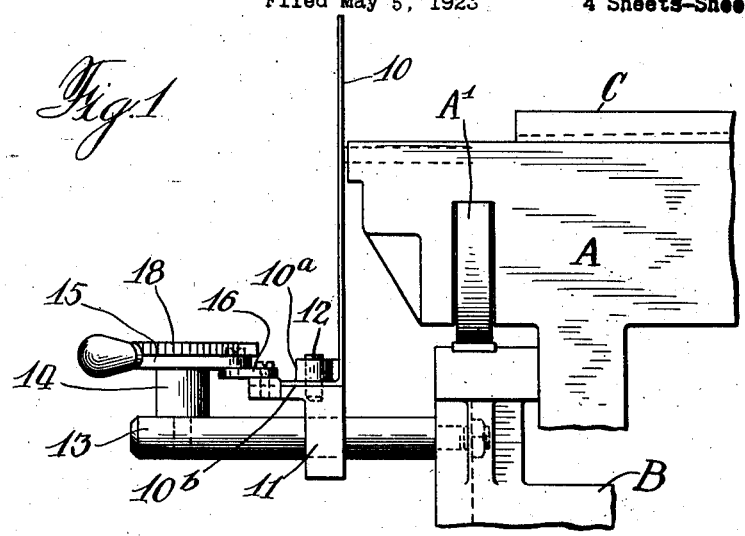
Fig. 1 is an end elevation, and Fig. 2 a plan of part of a slicing machine, of the type stated, fitting with an adjustable fence plate or abutment arranged to be readily moved to an inoperative position, or if desired, removed from the machine after the substance to be sliced has been initially set.
Figure 2:
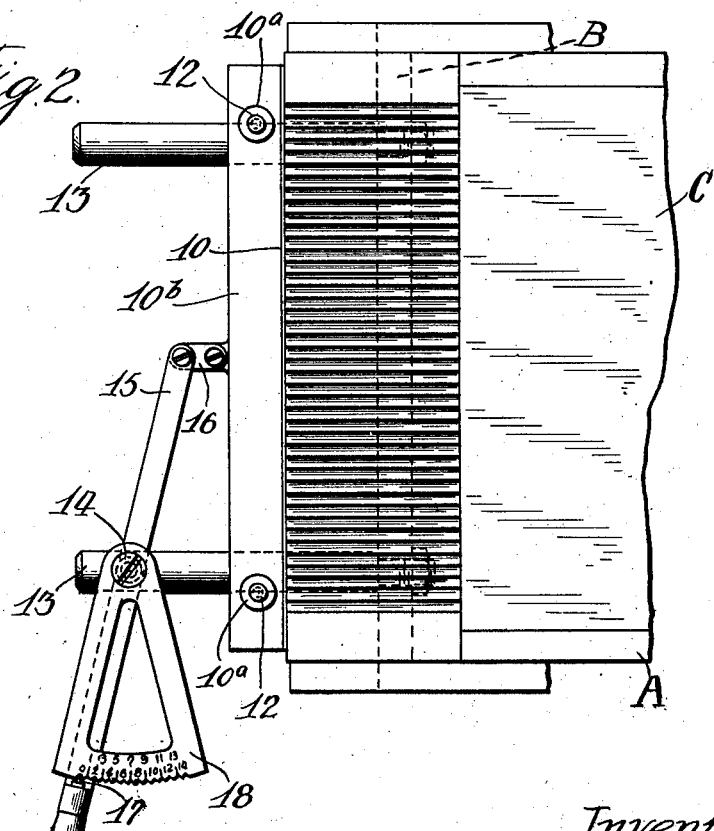

Referring now to Figs. 1 and 2, the abutment 10 is removably fitted on a bracket 11 by means of pins 12, 12 extending upwardly from the latter and engaging in openings in bosses 10ª, 10ª on a bottom flange 10ᵇ of the abutment. The bracket is mounted for sliding movement on pins 13, 13 projecting from the front wall of the machine base B so that the abutment will be moved towards or away from the plane of the knife or cutter of the machine according to the direction of said movement. Fulcrumed at 14 on one of the pins 13 is a lever 15 whose one end is connected by a link 16 with the bracket and whose other end constitutes a handle and is provided with a V-stop 17 engaging a notched and graduated quadrant 18 which is conveniently attached to one of the pins 13.

With this arrangement the abutment 10 can be set parallel to the plane of the cutter at a distance in advance thereof equal to the desired thickness of the slices by simply turning the lever 15 about its fulcrum 14 thereby sliding the bracket 11 (and consequently the abutment 10) to the correct position as determined by the setting of the stop 17 on the scale of the quadrant 18, the inner face of the abutment being in the cutting plane when the stop is opposite zero on the scale. If after the abutment has been set the meat or other substance to be sliced is secured on its supporting table or plate C with its leading face in engagement with the abutment it will be properly located to yield a full first slice of the required thickness upon reciprocation of the carriage A past the knife or cutter of the machine, but immediately after the substance has been initially set and before the carriage is moved, the abutment 10 can be lifted off the bracket and laid to one side so that free access can be had to the substance and its supporting table from the front and the substance will not be wiped across the face of the abutment at each reciprocation of the carriage. The thickness of all slices after the first is determined independently of the abutment by the usual intermittent feed mechanism of the machine which advances the supporting table C a step towards the cutter at each reciprocation of the carriage A.

When the abutment 10 is again required for initially setting another piece of meat or other substance on the machine it can be instantly dropped in place on the bracket 11 with the pins 12 engaging the holes in the bosses 10ª and can then be set with the bracket relatively to the cutting plane by means of the lever 15 in the manner already described. It is apparent that the bracket 11 does not require to be moved from its original setting if the required thickness of the slices to be cut from the piece is the same as that of the slices previously cut from the preceding piece.

Instead of lifting off the abutment 10 it may be moved horizontally away from the substance with the bracket by simply swinging the lever to the extreme right of the quadrant so as to move the abutment to an inoperative position.

In the arrangement illustrated at Fig. 3 the abutment 20 is formed with an arm or bracket 21 having a boss 21ª by which it is removably carried on a partly squared rod 22 slidable in a suitable bearing 23 in the machine base B and having a slotted extremity 22ª engaging a pin 24 on an arm 25 pivoted to the base B. At its upper end the arm supports a cross-head 27 which is constrained by a spring 26 into engagement with a member 28 on a slidably mounted rod 29 having rack teeth 29ª at its outer end in engagement with a pinion 30 rotatable with a pivotally supported indicator wheel or disc 31 at the right-hand side of the machine carriage. The abutment is retained in position on the rod 22 by friction means comprising a hand lever 32 pivoted in a slot 21ᵇ in the boss 22 and having a hole for the rod to pass through and a spring 33 which normally cants the hand lever, as shown in the drawing, so that the axis of the hole is askew to the axis of the rod (which is round at this part) and the edges of the hole frictionally engage the rod to prevent displacement of the abutment.

The abutment 20 can be set to the required position in advance of the cutting plate according to the thickness of slice desired by turning the indicator wheel 31 and thus sliding the rod 29 whereupon the rod 22 under the action of spring 26 also slides a corresponding amount in its bearing 23 and sets the abutment carried thereby according to the position of the indicator. If after the abutment has been set in this manner the meat or other substance is secured on the supporting table or plate C of the machine with its leading face in engagement with the abutment it will be properly located to give a full first slice upon reciprocation of the carriage A, but immediately after the initial positioning of the substance and before the carriage is reciprocated the abutment can be moved to an inoperative position clear of the substance by simply gripping together the arm 21 and hand lever 32, thereby relieving the frictional grip of the lever on the rod 22 whereupon the spring 34 will act on the boss 21ª to move it and the abutment outwards away from the cutting plane and clear of the substance. The abutment can then be turned down about the axis of the rod 22 clear of the front of the supporting table or plate or it can be bodily removed and laid to one side until again required for initially setting another piece of meat or other substance.

The rack bar 29, the pinion 30, and the rotatable indicator can be mounted on the base B if so desired so long as same are suitably arranged below the plane of the right-hand rollers A¹ of the reciprocating carriage.

In the arrangement illustrated at Figs. 4 to 6, the fence plate or abutment 36 is secured to an annular member 37 turnably and slidably mounted on a shaft 38 journaled in suitable bearings in the machine base B. At one end the shaft has a cam-shaped head 39 accommodated within the hollow annular member which has an inwardly projecting pin 40 constrained to engage the cam surface by means of a spring 41 on the shaft 38 between the member and the front wall of the base. At its other end the shaft 38 is provided with a crank or handle 42 by which the shaft can be rotated to vary the setting of the abutment relative to the plane of the cutter. A scale may be provided on the crank disc 42ª and an index on the machine base in order to determine the correct setting. Mounted on the shaft 38 between the member 37 and spring 41 is an arm 43 whose other end (see Fig. 6) engages a shoulder formed at the outer end of a pin 44 slidable in an opening in the front wall of the machine base. The outer end of the pin 44 is recessed and provided with a spring-pressed ball 45 which engages an opening or a depression in the abutment to retain the same in the operative position. Means may be provided for retaining the shaft 38 in any position to which it may be turned in order to set the abutment. For this purpose a spring-pressed pawl 42ᵇ may be incorporated in the handle and arranged to engage depressions in the adjacent wall of the base or in an annular plate secured to said wall round the shaft 38.

By turning the crank 42, the shaft 38 and cam-shaped piece 39 thereon are also turned and as the pin 40 carried by the member 37 is constrained into engagement with the cam surface by the spring 41 the member and the abutment will be moved towards or away from the front of the machine or the cutting plane of the knife according to the direction of rotation. The arm 43 and pin 44 also move in unison with the member 37 and abutment 36 and on that account the spring-pressed ball 45 is retained in engagement with the opening or depression in the abutment to maintain the latter in an upright position where it projects above the surface of the carriage, as shown in full lines in Figs. 4 and 5. After the abutment has been set and the meat or other substance initially positioned on the supporting table or plate C of the machine with its front face in engagement with the abutment as required to ensure a full first slice, the abutment can be turned down to an inoperative position below the level of the carriage and clear of the front of the substance, as shown in dotted outline, Fig. 5, by simply turning the annular member 37 in an anti-clockwise direction when the resistance of the spring-pressed ball 45 will be overcome and the abutment turned with the member about the axis of the shaft 38 without in any way interfering with the setting of said shaft and the cam piece thereon.

When the abutment is again required it can be just as easily swung back to the operative position in which it will be automatically retained by the spring-pressed ball 45 after the operator releases his hold on the member 37 whose outer surface may be milled or roughened to give a better grip.

Referring lastly to Figs. 7, 8 and 9, the abutment 47 in this case is arranged to slide relative to the cutting plane in horizontal slots or openings formed in a pair of brackets 48, 48 secured to the machine base, which brackets also constitute bearings for a cross-shaft 49 on which are two toothed wheels 50, 50, one adjacent each bracket. Toothed racks 51, 51 extending from the abutment engage with said wheels. At its outer end the shaft is provided with a hand wheel 52 which may be graduated, as shown in Fig. 9, and arranged to move past a stationary index 53 on the machine base. 54, 54 denotes shields or covers for the toothed wheels and racks.

By turning the hand wheel the shaft 49 and the toothed wheels 50, 50 are also turned whereby the racks 51, 51 and the abutment will be moved towards or away from the cutting plane according to the direction of rotation. In this way the abutment can be set to a position in advance of the cutting plane equal to the thickness of the slices desired, the setting being indicated by the pointer 53 on the scale of the hand wheel.

After the substance to be sliced has been positioned on the supporting table or plate C with its leading face in engagement with the abutment as required to ensure a full first slice and before the carriage A is reciprocated, the abutment can be moved outwards clear of the substance by rotating the wheel. In order that the abutment shall not prevent access to the front of the substance or its supporting table or plate C it may project only slightly above the level of the top of the table or plate, as shown in full lines, or it may be merely at or about or below the level of the table top, as indicated in dotted lines 47ª, so as to serve as a gauge for properly positioning the meat. The same remarks apply to the arrangement Figs. 1 and 2 and Fig. 3.

With all the arrangements described the abutment is required only for initially setting the substance to be sliced to ensure that the thickness of the first slice will be equal to that of the succeeding slices and it can immediately afterwards be moved to an inoperative position clear of the substance, the thickness of the succeeding slices being determined independently thereof by the intermittent forward movement of the table or plate supporting the substance. In every case the plate or abutment or gauge in the inoperative position permits free access to the table or plate from the front.

Instead of setting the plate or abutment or gauge parallel to the cutting plane of the knife and at a distance therefrom equal to the thickness of the first slice desired the same result can be obtained by arranging the plate or abutment or gauge so that in the operative position its inner face lies in the cutting plane, then initially setting the substance to be sliced by means of the plate or abutment or gauge, and then in the case of a plate or abutment moving the same to an inoperative position. If after this is done the machine is set in operation the table supporting the substance will be fed intermittently forward during the reciprocations of the carriage to yield slices, including the first slice, all of the same thickness. From this it follows that the plate or abutment or gauge does not of necessity require to be adjustable to and from the cutting plane of the knife.

The invention is shown and described as applied to machines wherein the substance is fed intermittently forward to the cutting knife on the return movement of the carriage, or partly on the return and partly on on the forward movement, but it may equally well be applied to machines wherein the substance is fed forward on the forward movement of the carriage, in which case the abutment, plate, or gauge need not be adjustable but may be arranged with its positioning face in line with the cutting plane or knife edge. Further, although the invention has been described as applied to slicing machines having a slidable table or plate C for supporting the substance to be sliced, it is also applicable to slicing machines having means other than such a table or plate by which the substance is automatically moved step by step towards the cutter by feed mechanism an amount determined by said mechanism independently of any fence plate or abutment.

Having now particularly described and ascertained the nature of our said invention, and in what manner the same is to be performed, we declare that what we claim is:

We claim:

1. A slicing machine having a support for material to be sliced, means for automatically moving said support various amounts to feed the material to produce slices of different predetermined thicknesses, an abutment plate for said slicing machine for initially positioning the material, said abutment plate being movable to different positions to produce slices of different thicknesses corresponding to the different amounts at which said support is fed, and means for indicating the position of said abutment plate corresponding to the predetermined thicknesses of slices.

2. The combination with a slicing machine, of an abutment plate for positioning the material to be sliced, an indicator to show the position of said abutment plate, means for automatically feeding the material amounts corresponding to graduations on said indicator, and means for positioning said abutment plate at a distance from the cutting plane of the knife equal to the thickness of a slice to be cut, said plate being movable away from said position after the material to be sliced has been located thereby to permit operation of said machine without interference by said abutment plate.

3. The combination with a slicing machine having a reciprocating table, and a support slidably mounted on said table, of means for automatically feeding said support various amounts equal to different thicknesses of slices to be cut, an abutment plate arranged adjacent the path of movement of said table, and means for moving said abutment plate transverse to the plane thereof for setting said abutment plate at positions spaced from the cutting plane of said machine various amounts corresponding to different thicknesses of slices to be cut.

4. The combination with a slicing machine having a reciprocating table, and a support slidably mounted on said table, of an abutment plate for initially positioning the material to be sliced, a lever for setting said abutment plate different distances from the cutting plane of said machine having adjustment positions corresponding to different thicknesses of slices to be cut, said plate being removable from its operating position to permit free movement of the material out of contact with said plate during a slicing operation, and means for automatically feeding the material amounts corresponding to the positions of said abutment plate, said feeding means being operative when said feeding plate is out of operative position.

5. The combination with a slicing machine having a reciprocating table and a support slidably mounted thereon having means for automatically feeding the support predetermined amounts, of an abutment plate for initially positioning material to be sliced, means for shifting said abutment plate in a direction transverse to the direction of reciprocation of said table to various distances away from the cutting plane of said machine, and a graduated member for retaining said plate in different positions, said member being graduated to correspond to different thicknesses of slices to be cut.

6. The combination with a slicing machine having a reciprocating table and a supporting member slidably mounted on said table to move transversely to the direction of reciprocation of said table, of an abutment plate having its plane extending in the direction of reciprocation of said table and arranged adjacent the path of travel thereof, means for shifting said abutment plate transversely to the direction of travel of said table to different positions spaced from the cutting plane of said machine corresponding to various thicknesses of slices to be cut, and a gauge for controlling the position of said plate and indexed to correspond to different thicknesses of slices, said plate being removable from its position adjacent the path of movement of said table to permit free movement of the material on said table without interference by said plate.

7. A slicing machine having a plate or abutment or gauge for use only in initially setting the substance to be sliced so as to ensure that the first slice severed will be of the desired thickness and arranged to be removed from the machine or moved to an inoperative position after the initial setting of the substance which during the operation of the machine is fed intermittently forward in such a manner as to yield further slices of the desired thickness after the first slice independently of said plate or abutment or gauge, substantially as described, a lever for moving said plate transverse to the plane thereof and a scale cooperating with said lever to indicate the position of said plate.

8. A slicing machine having a plate or abutment as claimed in claim 7, capable of being turned to an inoperative position below the level of the supporting table or plate so as to give free access to said table or plate from the front.

9. A slicing machine having a plate or abutment or gauge as claimed in claim 7, arranged to be moved horizontally to or away from the plane of the machine knife or cutter.

In testimony whereof I, HENRY THOMAS, have signed my name to this specification on this 6th day of April, 1923.

HENRY THOMAS.

In testimony whereof I, CORNELIS F. M. VAN BERKEL, have signed my name to this specification on this 17th day of April, 1923.

CORNELIS F. M. VAN BERKEL.